(12) United States Patent
Faraj

(10) Patent No.: US 7,653,716 B2
(45) Date of Patent: Jan. 26, 2010

(54) DETERMINING A BISECTION BANDWIDTH FOR A MULTI-NODE DATA COMMUNICATIONS NETWORK

(75) Inventor: Ahmad A. Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 11/838,965

(22) Filed: Aug. 15, 2007

(65) Prior Publication Data

US 2009/0049114 A1 Feb. 19, 2009

(51) Int. Cl.
*G06F 15/16* (2006.01)
(52) U.S. Cl. .................. 709/223; 709/224; 709/238; 370/252
(58) Field of Classification Search ......... 709/200–202, 709/223–227, 238; 370/252
See application file for complete search history.

(56) References Cited

U.S. PATENT DOCUMENTS

| | | | |
|---|---|---|---|
| 6,628,609 B2* | 9/2003 | Chapman et al. | 370/229 |
| 6,853,625 B2* | 2/2005 | Burmeister et al. | 370/252 |
| 6,992,983 B1* | 1/2006 | Chatterjee | 370/232 |
| 7,359,985 B2* | 4/2008 | Grove et al. | 709/238 |
| 7,532,642 B1* | 5/2009 | Peacock | 370/468 |

OTHER PUBLICATIONS http://www-unix.mcs.anl.gov/~gropp/bib/papers/1999/pvmmpi99/mpptest.pdf.
http://www.dolphinics.com/pdf/documentation/ScaBench-DS-A4.pdf.

* cited by examiner

*Primary Examiner*—Moustafa M Meky
(74) *Attorney, Agent, or Firm*—Biggers & Ohanian, LLP

(57) ABSTRACT

Methods, systems, and products are disclosed for determining a bisection bandwidth for a multi-node data communications network that include: partitioning nodes in the network into a first sub-network and a second sub-network in dependence upon a topology of the network; sending, by each node in the first sub-network to a destination node in the second sub-network, a first message having a predetermined message size; receiving, by each node in the first sub-network from a source node in the second sub-network, a second message; measuring, by each node in the first sub-network, the elapsed communications time between the sending of the first message and the receiving of the second message; selecting the longest elapsed communications time; and calculating the bisection bandwidth for the network in dependence upon the number of the nodes in the first sub-network, the predetermined message size of the first test message, and the longest elapsed communications time.

20 Claims, 9 Drawing Sheets

DETERMINING A BISECTION BANDWIDTH FOR A MULTI-NODE DATA COMMUNICATIONS NETWORK

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for determining a bisection bandwidth for a multi-node data communications network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory needed for message buffers and latency in the data communications among nodes. Designs of parallel computers use specially designed data communications links so that the communication overhead will be small but it is the parallel algorithm that decides the volume of the traffic.

Many data communications network topologies are used for message passing among nodes in parallel computers. Such network topologies may include for example, a tree, a rectangular mesh, and a torus. In a tree network, the nodes typically are connected into a binary tree: each node typically has a parent and two children (although some nodes may only have zero children or one child, depending on the hardware configuration). A tree network typically supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. The tree network, however, does not lend itself to and is typically inefficient for point-to-point operations. A rectangular mesh topology connects compute nodes in a three-dimensional mesh, and every node is connected with up to six neighbors through this mesh network. Each compute node in the mesh is addressed by its x, y, and z coordinate. A torus network connects the nodes in a manner similar to the three-dimensional mesh topology, but adds wrap-around links in each dimension such that every node is connected to its six neighbors through this torus network. A mesh or a torus network generally lends itself well for point-to-point communications. In computers that use a torus and a tree network, the two networks typically are implemented independently of one another, with separate routing circuits, separate physical links, and separate message buffers. Other network topology often used to connect nodes of a network includes a star, a ring, or a hypercube.

The different network topologies mentioned above each have different characteristics that impact the performance for data communications among the nodes in a network. One important performance characteristic is bisection bandwidth. Bisection bandwidth is the total network bandwidth that can be achieved when nodes from different, approximately equal size network partitions communication with one another. Bisection bandwidth may therefore be used as a measure of the bandwidth through a network bottleneck and may be used to represent the effectiveness of a network at handling injected traffic. Networks having a higher value for bisection bandwidth generally handle injected traffic better than networks having a lower value for bisection bandwidth. Because bisection bandwidth is such an effective measurement of how well any given network handles injected traffic, readers will appreciate any advancement in determining a bisection bandwidth for a multi-node data communications network.

SUMMARY OF THE INVENTION

Methods, systems, and products for determining a bisection bandwidth for a multi-node data communications network that include: partitioning nodes in the data communications network into a first sub-network and a second sub-network in dependence upon a physical network topology of the data communications network, the number of the nodes partitioned into the first sub-network being less than or equal to the number of the nodes partitioned into the second sub-network; sending, by each node in the first sub-network to a destination node in the second sub-network, a first test message having a predetermined message size; receiving, by each node in the first sub-network from a source node in the second sub-network, a second test message; measuring, by each node in the first sub-network, the elapsed communications time between the sending of the first test message and the receiving of the second test message; selecting the longest measured elapsed communications time; and calculating the bisection bandwidth for the data communications network in dependence upon the number of the nodes in the first sub-network, the predetermined message size of the first test message, and the longest measured elapsed communications time.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
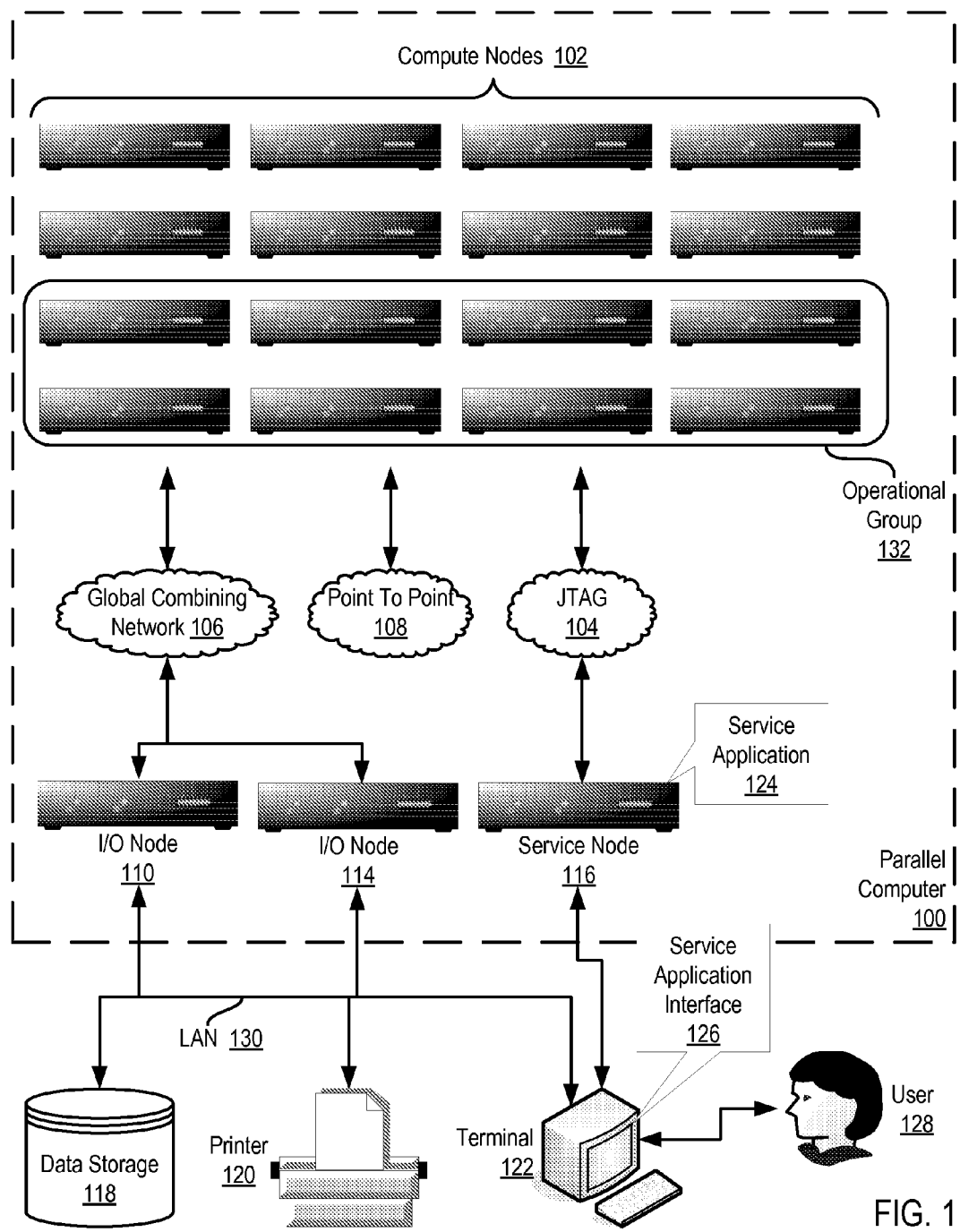
FIG. 1 illustrates an exemplary parallel computer for determining a bisection bandwidth for a multi-node data communications network according to embodiments of the present invention.

Exemplary methods, systems, and computer program products for determining a bisection bandwidth for a multi-node data communications network according to embodiments of the present invention are described with reference to the accompanying drawings, beginning with FIG. 1. FIG. 1 illustrates an exemplary parallel computer for determining a bisection bandwidth for a multi-node data communications network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) of FIG. 1 operates generally for determining a bisection bandwidth for a multi-node data communications network according to embodiments of the present invention. As mentioned above, bisection bandwidth is the total network bandwidth that can be achieved when nodes from different, approximately equal size network partitions communication with one another. The parallel computer (100) of FIG. 1 operates generally for determining a bisection bandwidth for a multi-node data communications network according to embodiments of the present invention by: partitioning nodes in the data communications network into a first sub-network and a second sub-network in dependence upon a physical network topology of the data communications network, the number of the nodes partitioned into the first sub-network being less than or equal to the number of the nodes partitioned into the second sub-network; sending, by each node in the first sub-network to a destination node in the second sub-network, a first test message having a predetermined message size; receiving, by each node in the first sub-network from a source node in the second sub-network, a second test message; measuring, by each node in the first sub-network, the elapsed communications time between the sending of the first test message and the receiving of the second test message; selecting the longest measured elapsed communications time; and calculating the bisection bandwidth for the data communications network in dependence upon the number of the nodes in the first sub-network, the predetermined message size of the first test message, and the longest measured elapsed communications time.

Readers will note that the description above of determining a bisection bandwidth for a multi-node data communications network according to embodiments of the present invention using a parallel computer is for explanation and not for limitation. In fact, determining a bisection bandwidth for a multi-node data communications network according to embodiments of the present invention may be carried out in any system with a plurality of nodes connected for data communications through a data communications network as will occur to those of skill in the art. Such systems may include distributed computing systems, cluster computing systems, grid computing systems, and so on.

The arrangement of nodes, networks, and I/O devices making up the exemplary system illustrated in FIG. 1 are for explanation only, not for limitation of the present invention. Data processing systems capable of determining a bisection bandwidth for a multi-node data communications network according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Determining a bisection bandwidth for a multi-node data communications network according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of determining a bisection bandwidth for a multi-node data communications network according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152).

Stored in RAM (156) is a performance testing module (158), a module of computer program instructions that carries out parallel, user-level data processing using parallel algorithms. In particular, the performance testing module (158) of FIG. 2 operates for determining a bisection bandwidth for a multi-node data communications network according to embodiments of the present invention. The performance testing module (158) of FIG. 2, along with similar performance testing modules on other compute nodes in the parallel computer, operate generally for determining a bisection bandwidth for a multi-node data communications network according to embodiments of the present invention by: partitioning nodes in the data communications network into a first sub-network and a second sub-network in dependence upon a physical network topology of the data communications network, the number of the nodes partitioned into the first sub-network being less than or equal to the number of the nodes partitioned into the second sub-network; sending, by each node in the first sub-network to a destination node in the second sub-network, a first test message having a predetermined message size; receiving, by each node in the first sub-network from a source node in the second sub-network, a second test message; measuring, by each node in the first sub-network, the elapsed communications time between the sending of the first test message and the receiving of the second test message; selecting the longest measured elapsed communications time; and calculating the bisection bandwidth for the data communications network in dependence upon the number of the nodes in the first sub-network, the predetermined message size of the first test message, and the longest measured elapsed communications time.

Although the description of the performance testing module (158) above describes determining a bisection bandwidth for a multi-node data communications network according to embodiments of the present invention occurring exclusively on the compute nodes of the parallel computer, readers will note that such a description is for explanation and not for limitation. In fact, determining a bisection bandwidth for a multi-node data communications network according to embodiments of the present invention may occur in part on a service node of the parallel computer. For example, a service node (not shown) may operate to support determining a bisection bandwidth for a multi-node data communications network according to embodiments of the present invention by: partitioning nodes in the data communications network into a first sub-network and a second sub-network in dependence upon a physical network topology of the data communications network, the number of the nodes partitioned into the first sub-network being less than or equal to the number of the nodes partitioned into the second sub-network; selecting the longest measured elapsed communications time from one of the compute nodes; and calculating the bisection bandwidth for the data communications network in dependence upon the number of the nodes in the first sub-network, the predetermined message size of the first test message, and the longest measured elapsed communications time.

Also stored in RAM (156) is a messaging module (160), a library of computer program instructions that carry out parallel communications among compute nodes, including point to point operations as well as collective operations. Performance testing module (158) executes point to point and collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
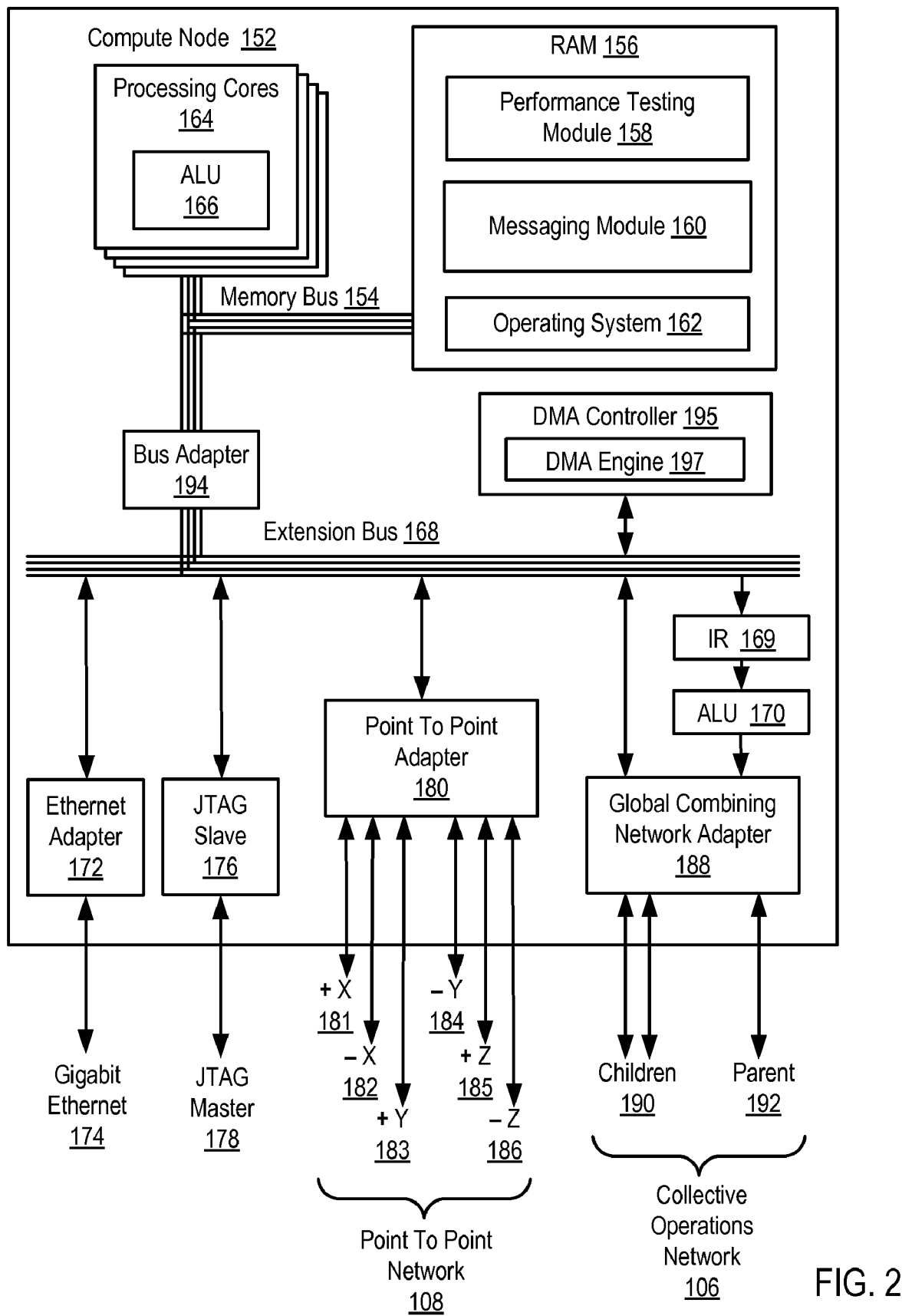
FIG. 2 sets forth a block diagram of an exemplary compute node useful in a parallel computer capable of determining a bisection bandwidth for a multi-node data communications network according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for determining a bisection bandwidth for a multi-node data communications network according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in determining a bisection bandwidth for a multi-node data communications network according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
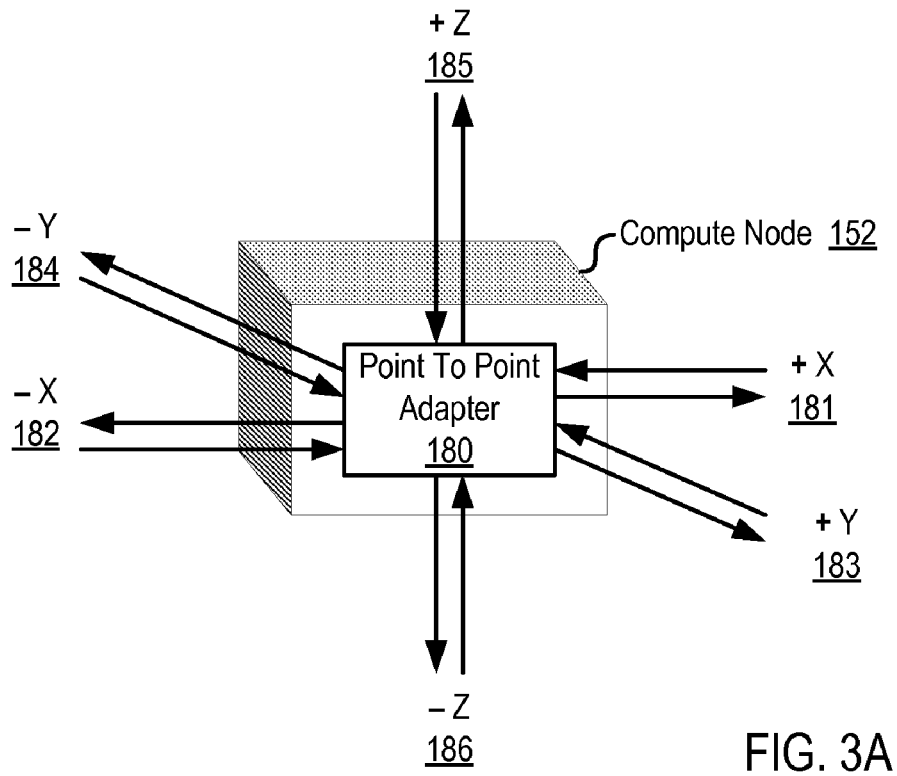
FIG. 3A illustrates an exemplary Point To Point Adapter useful in a parallel computer capable of determining a bisection bandwidth for a multi-node data communications network according to embodiments of the present invention.

For further explanation, FIG. 3A illustrates an exemplary Point To Point Adapter (180) useful in a parallel computer capable of determining a bisection bandwidth for a multi-node data communications network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
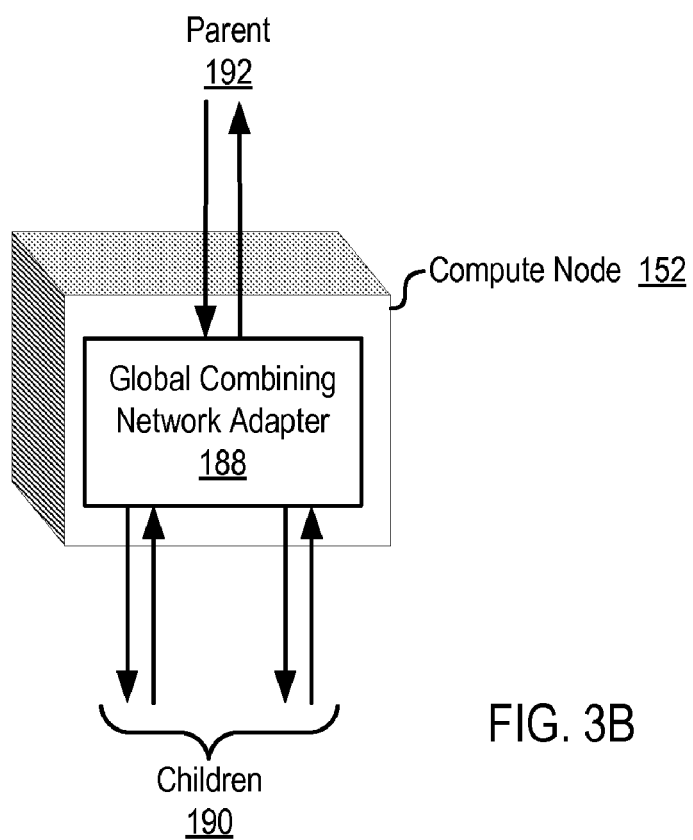
FIG. 3B illustrates an exemplary Global Combining Network Adapter useful in a parallel computer capable of determining a bisection bandwidth for a multi-node data communications network according to embodiments of the present invention.

For further explanation, FIG. 3B illustrates an exemplary Global Combining Network Adapter (188) useful in a parallel computer capable of determining a bisection bandwidth for a multi-node data communications network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
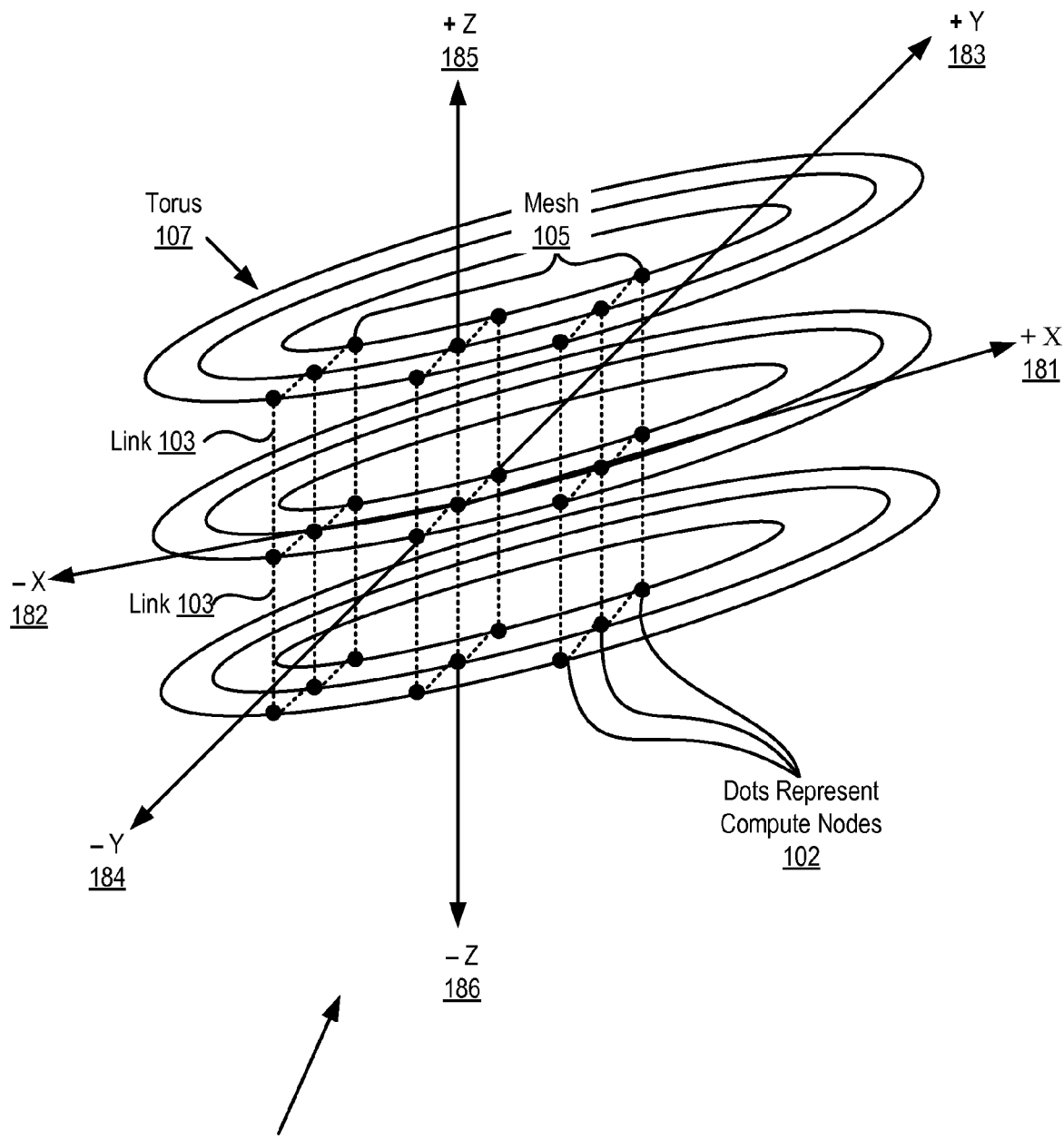
FIG. 4 sets forth a line drawing illustrating an exemplary data communications network optimized for point to point operations useful in a parallel computer capable of determining a bisection bandwidth for a multi-node data communications network according to embodiments of the present invention.

For further explanation, FIG. 4 sets forth a line drawing illustrating an exemplary data communications network (108) optimized for point to point operations useful in a parallel computer capable of determining a bisection bandwidth for a multi-node data communications network in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in determining a bisection bandwidth for a multi-node data communications network in accordance with embodiments of the present invention may contain only a few compute nodes or may contain thousands of compute nodes.

Figure 5:
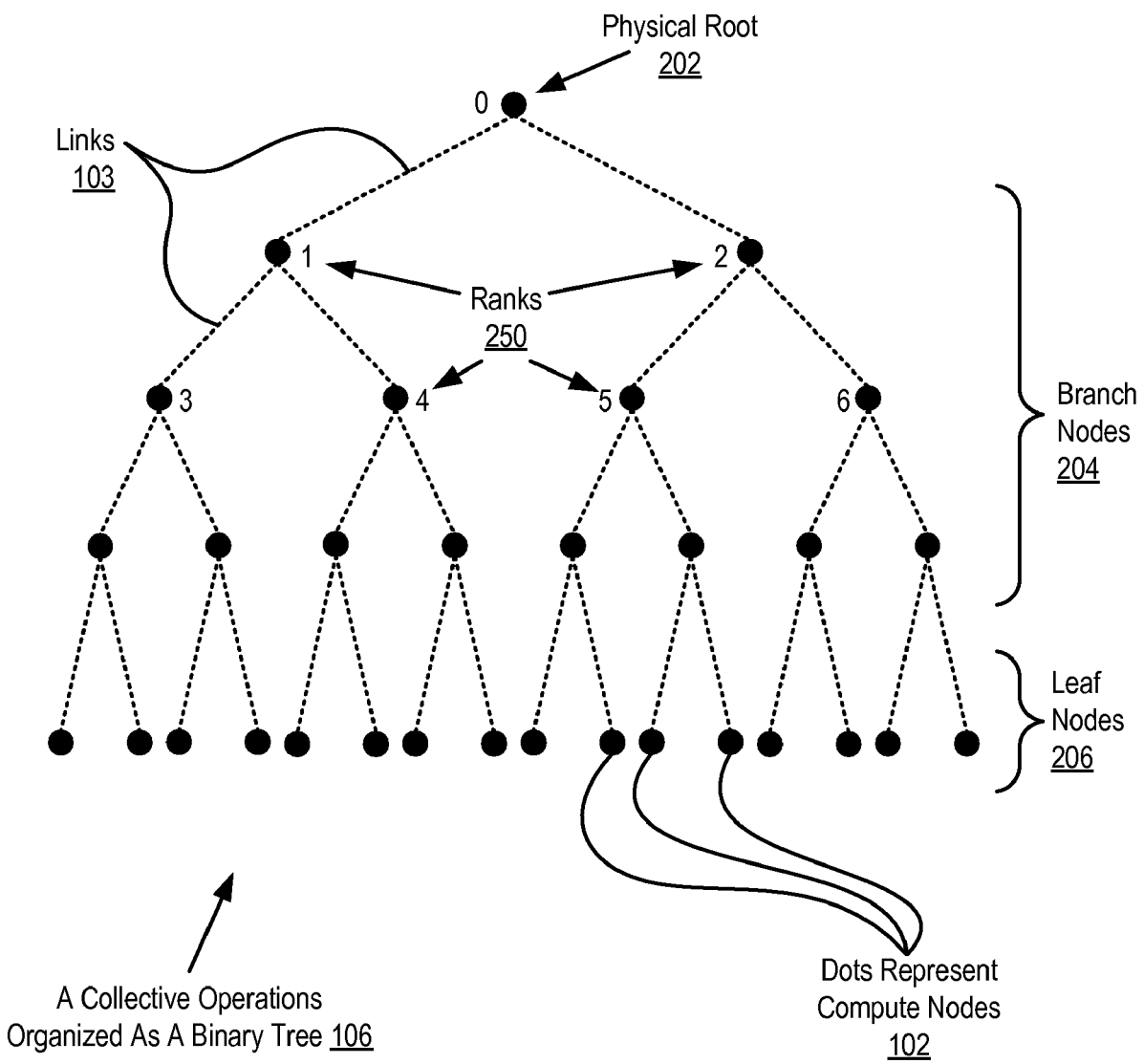
FIG. 5 sets forth a line drawing illustrating an exemplary data communications network optimized for collective operations useful in a parallel computer capable of determining a bisection bandwidth for a multi-node data communications network according to embodiments of the present invention.

For further explanation, FIG. 5 sets forth a line drawing illustrating an exemplary data communications network (106) optimized for collective operations useful in a parallel computer capable of determining a bisection bandwidth for a multi-node data communications network in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for determining a bisection bandwidth for a multi-node data communications network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
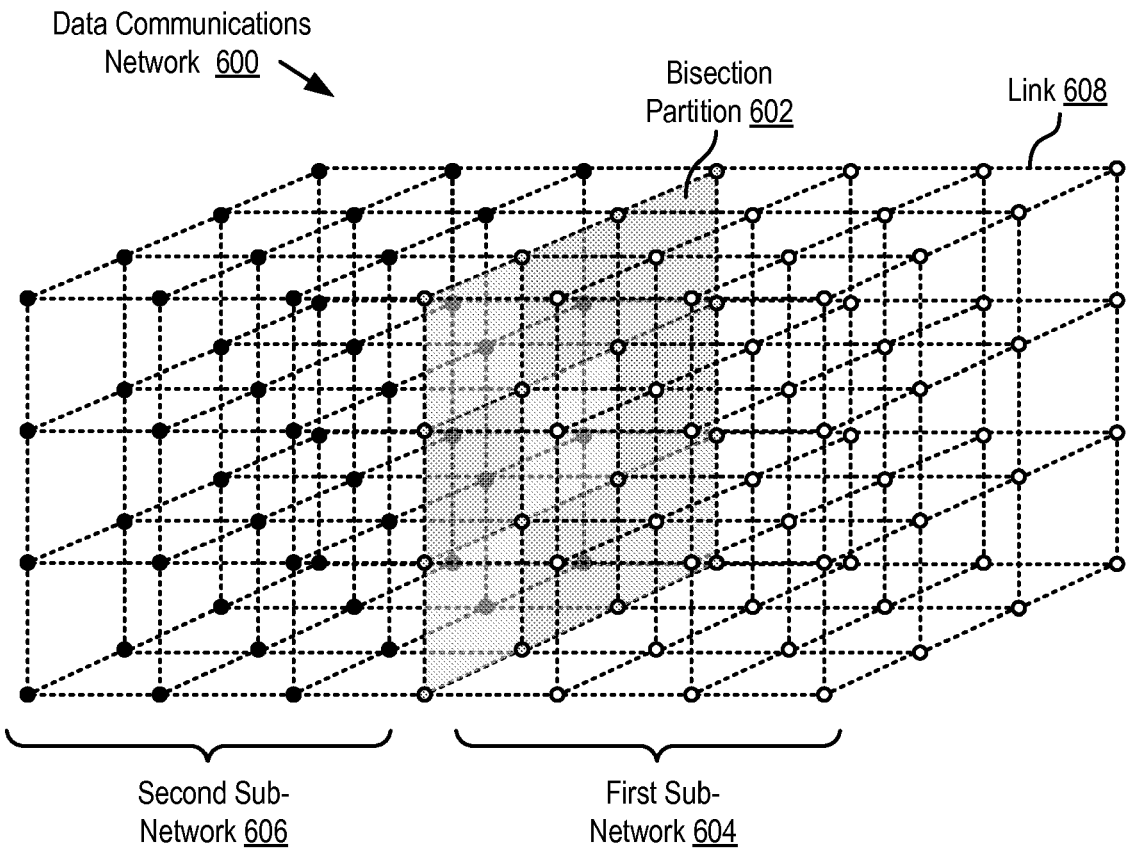
FIG. 6 sets forth a line drawing illustrating an exemplary multi-node data communications network useful in determining a bisection bandwidth according to the present invention.

For further explanation, FIG. 6 sets forth a line drawing illustrating an exemplary multi-node data communications network useful in determining a bisection bandwidth according to the present invention. The exemplary data communications network (600) of FIG. 6 includes 112 nodes connected for data communications in a rectangular mesh network topology. Each of the nodes illustrated in FIG. 6 is connected to each of its adjacent nodes in the network (600) using a bi-directional link (608). Although the exemplary network (600) in FIG. 6 includes 112 nodes, readers will note that any number of nodes may be included in a multi-node data communications network useful in determining a bisection bandwidth according to the present invention.

The nodes in the exemplary network (600) of FIG. 6 are partitioned into a first sub-network (604) and a second sub-network (606) in dependence upon the physical network topology of the data communications network (600). In the example of FIG. 6, the number of the nodes partitioned into the first sub-network (604) is equal to the number of the nodes partitioned into the second sub-network (606). Each sub-network (604, 606) includes 48 nodes. The remaining 16 nodes that are not included in either sub-network (604, 606) are referred to as 'partition nodes' and are used to create a bisection partition (602) between the two sub-networks (604, 606). Although all communications between the sub-networks (604, 606) are routed through these partition nodes when determining a bisection bandwidth according to the present invention, the partition nodes themselves do not initiate any of the communications. Rather, the partition nodes serve to create a bisection partition (602) between the two sub-networks (604, 606).

In the example of FIG. 6, the nodes in the data communications network (600) are partitioned into the sub-networks (604, 606) such that physical links (608) between the sub-networks (604, 606) are minimized. In the example of FIG. 6, the bisection partition (602) that minimizes the physical links (608) between the sub-networks (604, 606) occurs in a plane for the Y-Z dimension placed along the X-axis. Such a bisection partition (602) minimizes the physical links (608) between the sub-networks (604, 606) of FIG. 6 because a partition in the Y-Z plane has less nodes than a plane in the X-Y dimensions or a plane in the X-Z dimensions. That is, a partition in a Y-Z plane has 16 nodes, while partitions in an X-Y plane or an X-Z plane have 28 nodes. Having less nodes in the partition corresponds with having less physical links between the sub-networks. Partitioning the nodes in the data communications network (600) into the sub-networks (604, 606) such that physical links (608) between the sub-networks (604, 606) are minimized advantageously determines a bisection bandwidth for the network (600) using communications paths that place the maximum stress on the network (600) and helps provide a realistic worst-case evaluation of the bisection bandwidth for the network (600).

In the example of FIG. 6, the nodes in the data communications network (600) are also partitioned into the sub-networks (604, 606) such that the difference between the number of the nodes in each sub-network (604, 606) is below a predetermined threshold. In such a manner, the predetermined threshold provides a limit for how many more nodes may be included in one sub-network than the other. The predetermined threshold is often set at a value equal to the number of nodes in the bisection partition used to the partition a network into two sub-networks. Although the difference between the number of nodes in the sub-networks (604, 606) of FIG. 6 is zero, in other networks having a different topology or a different number of nodes, the difference between nodes in the two sub-networks may be some other value between zero and the predetermined threshold. For example, if 16 nodes were added to the network (600) of FIG. 6 in a Y-Z plane along the X dimension, then one of the sub-networks (604, 606) would have 16 more nodes than the other.

After the nodes in the data communications network (600) of FIG. 6 are partitioned into the first sub-network (604) and the second sub-network (606), often by a service node when the nodes are implemented as compute nodes in a parallel computer, each node in the first sub-network (604) sends a first test message having a predetermined message size to a destination node in the second sub-network (606). Each node in the first sub-network (604) receives a second test message from a source node in the second sub-network (606). Each node in the first sub-network (604) measures the elapsed communications time between the sending of the first test message and the receiving of the second test message and selects the longest measured elapsed communications time. The bisection bandwidth for the data communications network is then calculated, in some embodiments by a service node, in dependence upon the number of the nodes in the first sub-network, the predetermined message size of the first test message, and the longest measured elapsed communications time.

Figure 7:
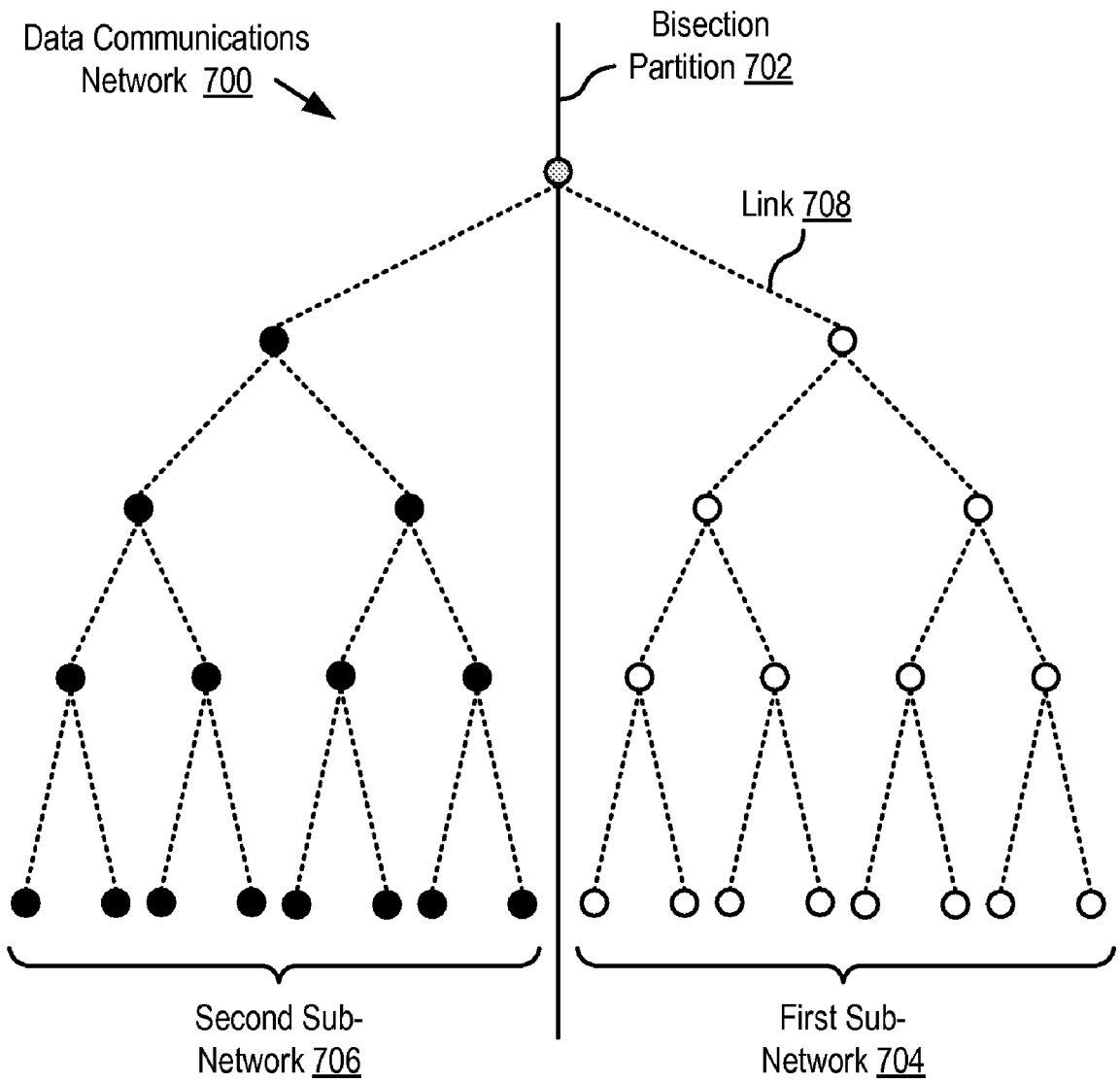
FIG. 7 sets forth a line drawing illustrating a further exemplary multi-node data communications network useful in determining a bisection bandwidth according to the present invention.

FIG. 6 illustrates a multi-node data communications network useful in determining a bisection bandwidth according to the present invention that is implemented as a rectangular mesh. As mentioned above, multi-node data communications networks useful in determining a bisection bandwidth according to the present invention may be implemented using a variety of network topologies. For further explanation, FIG. 7 sets forth a line drawing illustrating a further exemplary multi-node data communications network useful in determining a bisection bandwidth according to the present invention. The exemplary data communications network (700) of FIG. 7 includes 31 nodes connected for data communications in a tree network topology. Each of the nodes illustrated in FIG. 7 is connected to each of its adjacent nodes in the network (700) using a bi-directional link (708). Although the exemplary network (700) in FIG. 7 includes 31 nodes, readers will note that any number of nodes may be included in a multi-node data communications network useful in determining a bisection bandwidth according to the present invention.

The nodes in the exemplary network (700) of FIG. 7 are partitioned into a first sub-network (704) and a second sub-network (706) in dependence upon the physical network topology of the data communications network (700). In the example of FIG. 7, the number of the nodes partitioned into the first sub-network (704) are equal to the number of the nodes partitioned into the second sub-network (706). Each sub-network (704, 706) includes 15 nodes. The remaining 1 node that is not included in either sub-network (704, 706) is referred to as a 'partition node' and is used to create a bisection partition (702) between the two sub-networks (704, 706). Although all communications between the sub-networks (704, 706) are routed through these partition nodes when determining a bisection bandwidth according to the present invention, the partition nodes themselves do not initiate any of the communications. Rather, the partition nodes serve to create a bisection partition (702) between the two sub-networks (704, 706).

In the example of FIG. 7, the nodes in the data communications network (700) are partitioned into the sub-networks (704, 706) such that physical links (708) between the sub-networks (704, 706) are minimized. Because the network (700) in the example of FIG. 7 is organized in a tree topology with only a single link between each of the nodes, the bisection partition (702) that minimizes the physical links (708) between the sub-networks (704, 706) may be placed through any of the non-leaf nodes of the tree. In the example of FIG. 7, however, the bisection partition (702) is place through the root node because such a partition provides an equal number of node in each sub-network (704, 706).

In the example of FIG. 7, the nodes in the data communications network (700) are also partitioned into the sub-networks (704, 706) such that the difference between the number of the nodes in each sub-network (704, 706) is below a predetermined threshold. In such a manner, the predetermined threshold provides a limit for how many more nodes may be included in one sub-network than the other. The predetermined threshold is often set at a value equal to the number of nodes in the bisection partition used to the partition a network into two sub-networks. Although the difference between the number of nodes in the sub-networks (704, 706) of FIG. 7 is zero, in other networks having a different topology or a different number of nodes, the difference between nodes in the two sub-networks may be some other value between zero and the predetermined threshold. For example, if 1 node were added to one of the leaf nodes in second sub-network (706) of FIG. 7, then the second sub-network (706) would have one more node than the first sub-network (704).

After the nodes in the data communications network (700) of FIG. 7 are partitioned into the first sub-network (704) and the second sub-network (706), often by a service node when the nodes are implemented as compute nodes in a parallel computer, each node in the first sub-network (704) sends a first test message having a predetermined message size to a destination node in the second sub-network (706). Each node in the first sub-network (704) receives a second test message from a source node in the second sub-network (706). Each node in the first sub-network (704) measures the elapsed communications time between the sending of the first test message and the receiving of the second test message and selects the longest measured elapsed communications time. The bisection bandwidth for the data communications network is then calculated, in some embodiments by a service node, in dependence upon the number of the nodes in the first sub-network, the predetermined message size of the first test message, and the longest measured elapsed communications time.

Figure 8:
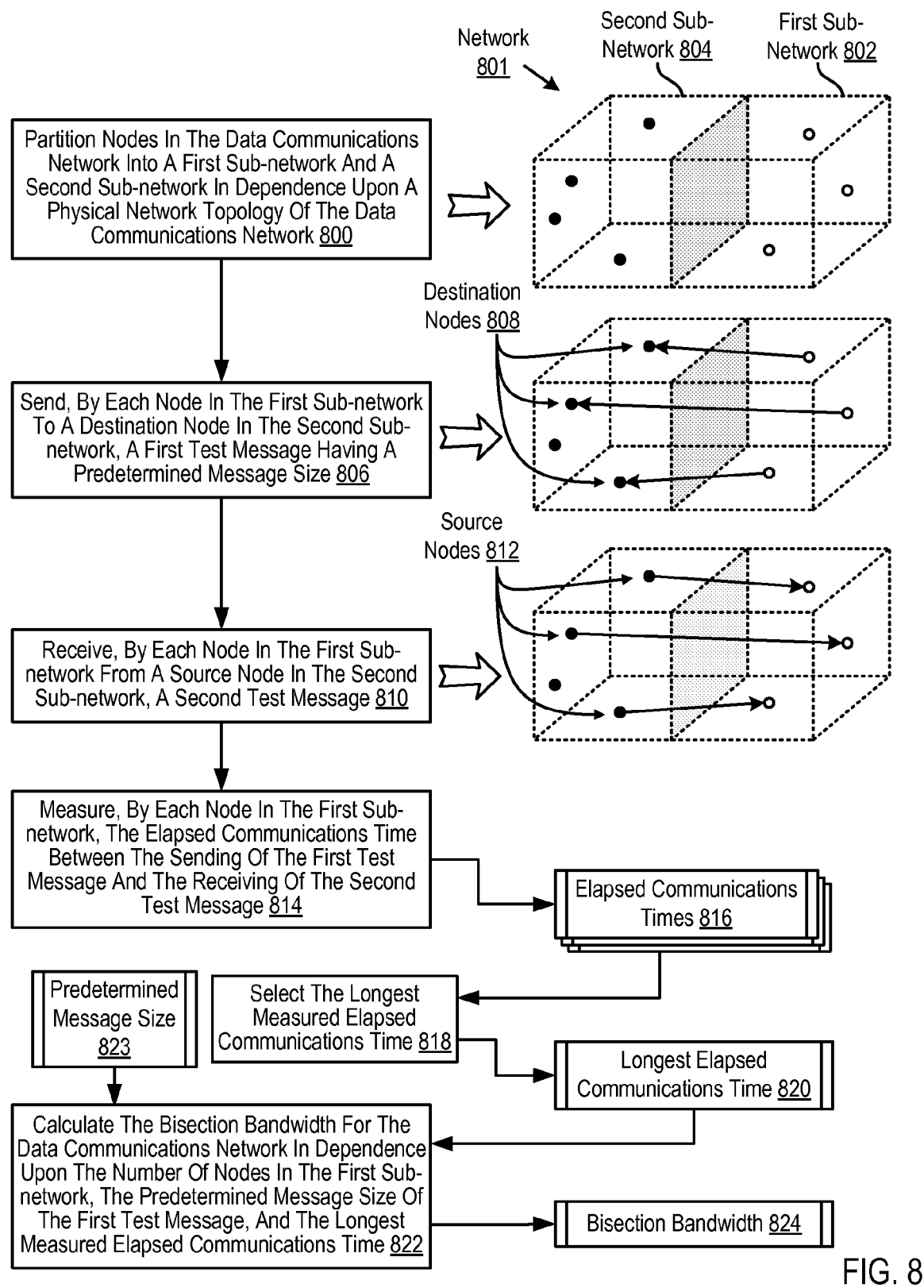
FIG. 8 sets forth a flow chart illustrating an exemplary method for determining a bisection bandwidth for a multi-node data communications network according to the present invention.

There are several different communications patterns that may be useful in determining a bisection bandwidth for a multi-node data communications network according to embodiments of the present invention. One of those communications patterns is a ping-pong communications pattern between the nodes of the sub-networks. For further explanation, FIG. 8 sets forth a flow chart illustrating an exemplary method for determining a bisection bandwidth for a multi-node data communications network according to the present invention utilizing a ping-pong communications pattern. The example of FIG. 8 includes a data communications network (801) organized using a rectangular mesh network topology. FIG. 8 illustrates seven nodes in the network (801), although readers will note that such a network may include any number of nodes connected for data communications.

The method of FIG. 8 includes partitioning (800) nodes in the data communications network (801) into a first sub-network (802) and a second sub-network (804) in dependence upon a physical network topology of the data communications network (801). The network topology represents the nodes in the network (801) and the links in the network (801) used to connect the nodes. The nodes in the data communications network (801) of FIG. 8 are partitioned into the sub-networks (802, 804) such that physical links between the sub-networks are minimized. In such a manner, the bisection bandwidth is determined using communications paths that place the maximum stress on the network (801), which helps provide a realistic worst-case evaluation of the bisection bandwidth for the network (801). The nodes in the data communications network (801) of FIG. 8 are also partitioned into the sub-networks (802, 804) such that the difference between the number of the nodes in each sub-network is below a predetermined threshold. In such a manner, the predetermined threshold may be used to keep the number of nodes in each sub-network (802, 804) approximately equal. In the example of FIG. 8, three nodes are partitioned into the first sub-network (804) and are shown in FIG. 8 using the color white. Four nodes are partitioned into the second sub-network (806) and are shown in FIG. 8 using the color black. As illustrated in FIG. 8, when the number of nodes in the sub-networks (802, 804) are unequal, the number of the nodes partitioned into the first sub-network (802) is less than the number of the nodes partitioned into the second sub-network (804).

Partitioning (800) nodes in the data communications network (801) into a first sub-network (802) and a second sub-network (804) according to the method of FIG. 8 may be carried out by a service node of a parallel computer using a graph representation of the entire network topology when the network (801) is implemented in the parallel computer. Readers will note, however, that the nodes may partition themselves into the sub-networks (802, 804) using a graph representation of the entire network topology. Such a graph representation of the network topology may be implemented using, for example, the Graph Description Language ('GDL'), the eXtensible Graph Markup and Modeling Language ('XGMML'), C++ objects, Java objects, or any other implementation as will occur to those of skill in the art.

The method of FIG. 8 includes sending (806), by each node in the first sub-network (802) to a destination node in the second sub-network (804), a first test message having a predetermined message size (823). Each node in the first sub-network (802) may send (806) a first test message having a predetermined message size (823) to a destination node in the second sub-network (804) according to the method of FIG. 8 by encapsulating the first test message into packets and injecting those packets into the network (801) for routing to the destination node (808). The predetermined message size (823) of FIG. 8 may be set depending on the average size message included in the network traffic for the network (801). Readers will note, however, such an example is for explanation and not for limitation. Any predetermined message size as will occur to those of skill in the art may be useful in determining a bisection bandwidth for a multi-node data communications network according to the present invention.

Each node in the first sub-network (802) may be paired to a destination node (808) in the second sub-network (804) using any algorithm as will occur to those of skill in the art. One such algorithm may randomly pair each node in the first sub-network (802) with a destination node (808) in the second sub-network (804). Readers will note that because the second sub-network (804) of FIG. 8 has one less node than the first sub-network (802), one node in the second sub-network (804) will not be paired with any of the nodes in the first sub-group (802).

The method of FIG. 8 also includes receiving (810), by each node in the first sub-network (802) from a source node (812) in the second sub-network (804), a second test message. Each node in the first sub-network (802) may receive (810) a second test message from a source node (812) in the second sub-network (804) according to the method of FIG. 8 by receiving network packets from the source node (812) that encapsulate the second test message. In the example of FIG. 8, the source node (812) for each node in the first sub-network (802) and the destination node (808) for that node are the same node because the communications patterned being used to determine the bisection bandwidth is a ping-pong pattern. As such, each node in the first sub-network (802) may receive (810) a second test message from a source node (812) in the second sub-network (804) according to the method of FIG. 8 by receiving the second test message from the source node (812) in response to the sending of the first test message to that same node.

The method of FIG. 8 includes measuring (814), by each node in the first sub-network (802), the elapsed communications time (816) between the sending (806) of the first test message and the receiving (810) of the second test message. Each node in the first sub-network (802) may measure (814) the elapsed communications time (816) according to the method of FIG. 8 by capturing a start time when the first test message is sent (806), capturing an end time when the second test message is received (810), and setting the difference between the end time and the start time as the elapsed communications time (816) for that node.

The method of FIG. 8 also includes selecting (818) the longest measured elapsed communications time (820). Selecting (818) the longest measured elapsed communications time (820) according to the method of FIG. 8 may be carried out by a service node of a parallel computer when the network (801) is implemented in the parallel computer. Such a service node may collect all of the measured elapsed communications times (816) from each of the nodes in the first sub-network (802) and designated the elapsed communications times (816) with the highest value as the longest measured elapsed communications time (820). In other embodiments, all of the nodes in the first sub-network (802) may broadcast their elapsed communications times (816) to a designated node in the network (801), and that designated node may select (818) the longest measured elapsed communications time (820) from among all of the elapsed communications times (816).

The method of FIG. 8 includes calculating (822) the bisection bandwidth (824) for the data communications network (801) in dependence upon the number of the nodes in the first sub-network (802), the predetermined message size (823) of the first test message, and the longest measured elapsed communications time (820). Calculating (822) the bisection bandwidth (824) for the network (801) according to the method of FIG. 8 may be carried out on a service node of a parallel computer, on a designated node in the network (801), or some other node as will occur to those of skill in the art. Regardless of the node carrying out the calculation, calculating (822) the bisection bandwidth (824) for the network (801) according to the method of FIG. 8 may carried out by multiplying the number of the nodes in the first sub-network (802) by the predetermined message size (823) and dividing the multiplication result by the longest measured elapsed communications time (820). For example, consider a network having 48 nodes in the first sub-network, that the predetermined message size is 512 kilobytes, and that the longest measured elapsed time is 3 milliseconds. In such an example, the bisection bandwidth may be calculated as follows:

$B = N*S \div T$ $B = 48 \text{ nodes} * 512 \text{ kilobytes} \div 3 \text{ milliseconds}$ $B = 8{,}192 \text{ bytes per second}$ where 'B' is the bisection bandwidth for the network, 'N' is a number of the nodes in the first sub-network, 'S' predetermined message size, and 'T' longest measured elapsed communications time.

As mentioned above, there are several different communications patterns that may be useful in determining a bisection bandwidth for a multi-node data communications network according to embodiments of the present invention. FIG. 8 describes a ping-pong communications pattern. Another one of those communications patterns is an all-to-all communications pattern between the nodes of the sub-networks. For further explanation, FIG. 9 sets forth a flow chart illustrating a further exemplary method for determining a bisection bandwidth for a multi-node data communications network according to the present invention. The example of FIG. 8 includes a data communications network (801) organized using a rectangular mesh network topology. FIG. 8 illustrates seven nodes in the network (801), although readers will note that such a network may include any number of nodes connected for data communications.

Figure 9:
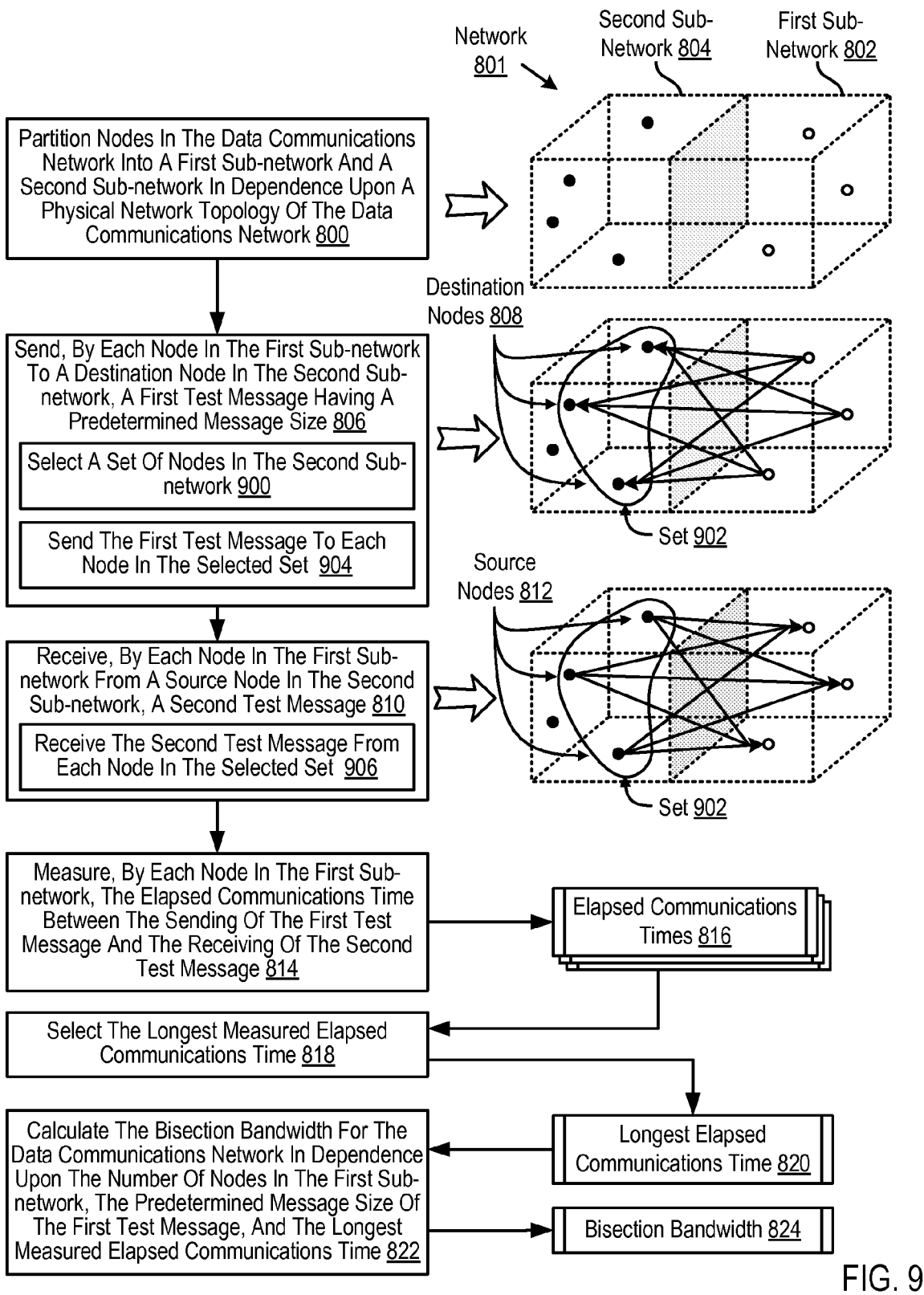
FIG. 9 sets forth a flow chart illustrating a further exemplary method for determining a bisection bandwidth for a multi-node data communications network according to the present invention.

The method of FIG. 9 includes partitioning (800) nodes in the data communications network (801) into a first sub-network (802) and a second sub-network (804) in dependence upon a physical network topology of the data communications network (801). Partitioning (800) nodes in the data communications network (801) into a first sub-network (802) and a second sub-network (804) according to the method of FIG. 9 may be carried out in a manner similar to the manner described above with reference to FIG. 8. In the example of FIG. 9, three nodes are partitioned into the first sub-network (804) and are shown in FIG. 9 using the color white. Four nodes are partitioned into the second sub-network (806) and are shown in FIG. 9 using the color black. As illustrated in FIG. 9, when the number of nodes in the sub-networks (802, 804) are unequal, the number of the nodes partitioned into the first sub-network (802) is less than the number of the nodes partitioned into the second sub-network (804).

The method of FIG. 9 includes sending (806), by each node in the first sub-network (802) to a destination node (808) in the second sub-network (804), a first test message having a predetermined message size (823). Sending (806), by each node in the first sub-network (802) to a destination node (808) in the second sub-network (804), a first test message according to the method of FIG. 9 includes selecting (900) a set (902) of nodes in the second sub-network (804) that include the same number of nodes as the number of nodes in the first sub-network (802) and sending (904), by each node in the first sub-network (802) to each node in the selected set of nodes in the second sub-network (804), the first test message. The set (902) of nodes in the second sub-network (804) may be selected (900) by a service node of a parallel computer, by a designated node in the network (801), or by any other node as will occur to those of skill in the art. Selecting (900) a set (902) of nodes in the second sub-network (804) according to the method of FIG. 9 may be carried out using a random selection algorithm. In the example of FIG. 9, the set (902) only includes three nodes in the second sub-network because the first sub-network only includes three nodes. Each node in the first sub-network (802) may send (904) the first test message to each node in the selected set (902) according to the method of FIG. 9 by encapsulating the first test message into packets and injecting those packets into the network (801) for routing to each of the nodes in the set (902).

The method of FIG. 9 also includes receiving (810), by each node in the first sub-network (802) from a source node (812) in the second sub-network (804), a second test message. Receiving (810), by each node in the first sub-network (802) from a source node (812) in the second sub-network (804), a second test message according to the method of FIG. 9 includes receiving (906), by each node in the first sub-network (802) from each node in the selected set of nodes in the second sub-network (804), the second test message. Each node in the first sub-network (802) may receive (906) the second test message from each node in the selected set (902) according to the method of FIG. 9 by receiving a group of packets from each of the nodes in the set (902) such that each group of packets encapsulates a second test message from one of the nodes of the set (902).

The method of FIG. 9 includes measuring (814), by each node in the first sub-network (802), the elapsed communications time (816) between the sending (806) of the first test message and the receiving (810) of the second test message. Each node in the first sub-network (802) may measure (814) the elapsed communications time (816) according to the method of FIG. 9 by capturing a start time when the first test message is sent (806) to the first node in the set (902), capturing an end time when the second test message is received (810) from the last node in the set (902), and setting the difference between the end time and the start time as the elapsed communications time (816) for that node.

The method of FIG. 9 also includes selecting (818) the longest measured elapsed communications time (820). Selecting (818) the longest measured elapsed communications time (820) according to the method of FIG. 9 may be carried out in a manner similar to the manner described above with reference to FIG. 8.

The method of FIG. 9 includes calculating (822) the bisection bandwidth (824) for the data communications network (801) in dependence upon the number of the nodes in the first sub-network (802), the predetermined message size (823) of the first test message, and the longest measured elapsed communications time (820). Calculating (822) the bisection bandwidth (824) for the network (801) according to the method of FIG. 9 may be carried out on a service node of a parallel computer, on a designated node in the network (801), or some other node as will occur to those of skill in the art. Regardless of the node carrying out the calculation, calculating (822) the bisection bandwidth (824) for the network (801) according to the method of FIG. 9 may carried out by multiplying the number of the nodes in the first sub-network (802) with the number of the nodes in the second sub-network (804) and with the predetermined message size (823) and dividing the multiplication result by the longest measured elapsed communications time (820). For example, consider a network having 48 nodes in the first sub-network and 48 nodes in the selected set from the second sub-network, that the predetermined message size is 512 kilobytes, and the longest measured elapsed time is 3 milliseconds. In such an example, the bisection bandwidth may be calculated as follows:

$$B = N_{1st} * N_{2nd} * S \div T$$

$$B = 48 \text{ nodes} * 48 \text{ nodes} * 512 \text{ kilobytes} \div 3 \text{ milliseconds}$$

$$B = 393,216 \text{ bytes per second}$$

where 'B' is the bisection bandwidth for the network, '$N_{1st}$' is number of the nodes in the first sub-network, '$N_{2nd}$' is number of the nodes in the selected set from the second sub-network, 'S' predetermined message size, and 'T' longest measured elapsed communications time. Readers will note that calculating the bisection bandwidth for an all-to-all communications pattern differs from the calculations of bisection bandwidth for a ping-pong communications pattern in that the number of nodes in the second-subgroup is also included in the calculation. The difference arises because in the all-to-all communications pattern, each node in the first sub-network is sending a message to each of the nodes in the selected set of the second sub-network, while in the ping-pong communications pattern, each node in the first sub-network only sends a message to one of the nodes in the second sub-network. The bisection bandwidth calculation for the all-to-all communications pattern, therefore, effectively multiplies the bisection bandwidth calculation for the ping-pong communications pattern by the number of nodes in the selected set of nodes from the second sub-network.

Exemplary embodiments of the present invention are described largely in the context of a fully functional parallel computer system for determining a bisection bandwidth for a multi-node data communications network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for determining a bisection bandwidth for a multi-node data communications network, the method comprising:

partitioning nodes in the data communications network into a first sub-network and a second sub-network in dependence upon a physical network topology of the data communications network, the number of the nodes partitioned into the first sub-network being less than or equal to the number of the nodes partitioned into the second sub-network;

sending, by each node in the first sub-network to a destination node in the second sub-network, a first test message having a predetermined message size;

receiving, by each node in the first sub-network from a source node in the second sub-network, a second test message;

measuring, by each node in the first sub-network, the elapsed communications time between the sending of the first test message and the receiving of the second test message;

selecting the longest measured elapsed communications time; and calculating the bisection bandwidth for the data communications network in dependence upon the number of the nodes in the first sub-network, the predetermined message size of the first test message, and the longest measured elapsed communications time.

2. The method of claim 1 wherein the destination node for each node in the first sub-network and the source node for that node are the same node.

3. The method of claim 1 wherein:

sending, by each node in the first sub-network to a destination node in the second sub-network, a first test message further comprises:

selecting a set of nodes in the second sub-network, the set comprising the same number of nodes as the number of nodes in the first sub-network, and sending, by each node in the first sub-network to each node in the selected set of nodes in the second sub-network, the first test message; and receiving, by each node in the first sub-network from a source node in the second sub-network, a second test message further comprises receiving, by each node in the first sub-network from each node in the selected set of nodes in the second sub-network, the second test message.

4. The method of claim 1 wherein the first test message and the second test message are the same size.

5. The method of claim 1 wherein the nodes in the data communications network are partitioned into the sub-networks such that physical links between the sub-networks are minimized and such that the difference between the number of the nodes in each sub-network is below a predetermined threshold.

6. The method of claim 1 wherein the nodes in the data communications network are compute nodes comprised in a parallel computer, the compute nodes connected together for data communications through a plurality of data communications networks, at least one of the data communications networks optimized for point to point operations, at least one of the data communications networks optimized for collective operations.

7. A system for determining a bisection bandwidth for a multi-node data communications network, the system comprising a plurality of nodes connected together for data communications through the data communications network, each node comprising a computer processor and computer memory operatively coupled to the computer processor, the computer memory having disposed within it computer program instructions capable of:
- partitioning the plurality of nodes in the data communications network into a first sub-network and a second sub-network in dependence upon a physical network topology of the data communications network, the number of the nodes partitioned into the first sub-network being less than or equal to the number of the nodes partitioned into the second sub-network;
- sending, by each node in the first sub-network to a destination node in the second sub-network, a first test message having a predetermined message size;
- receiving, by each node in the first sub-network from a source node in the second sub-network, a second test message;
- measuring, by each node in the first sub-network, the elapsed communications time between the sending of the first test message and the receiving of the second test message;
- selecting the longest measured elapsed communications time; and
- calculating the bisection bandwidth for the data communications network in dependence upon the number of the nodes in the first sub-network, the predetermined message size of the first test message, and the longest measured elapsed communications time.

8. The system of claim 7 wherein the destination node for each node in the first sub-network and the source node for that node are the same node.

9. The system of claim 7 wherein:
- sending, by each node in the first sub-network to a destination node in the second sub-network, a first test message further comprises:
- selecting a set of nodes in the second sub-network, the set comprising the same number of nodes as the number of nodes in the first sub-network, and
- sending, by each node in the first sub-network to each node in the selected set of nodes in the second sub-network, the first test message; and
- receiving, by each node in the first sub-network from a source node in the second sub-network, a second test message further comprises receiving, by each node in the first sub-network from each node in the selected set of nodes in the second sub-network, the second test message.

10. The system of claim 7 wherein the first test message and the second test message are the same size.

11. The system of claim 7 wherein the nodes in the data communications network are partitioned into the sub-networks such that physical links between the sub-networks are minimized and such that the difference between the number of the nodes in each sub-network is below a predetermined threshold.

12. The system of claim 7 wherein the plurality of nodes in the data communications network are compute nodes comprised in a parallel computer, the compute nodes connected together for data communications through a plurality of data communications networks, at least one of the data communications networks optimized for point to point operations, at least one of the data communications networks optimized for collective operations.

13. A computer program product for determining a bisection bandwidth for a multi-node data communications network, the computer program product disposed upon a computer readable medium, the computer program product comprising computer program instructions capable of:
- partitioning nodes in the data communications network into a first sub-network and a second sub-network in dependence upon a physical network topology of the data communications network, the number of the nodes partitioned into the first sub-network being less than or equal to the number of the nodes partitioned into the second sub-network;
- sending, by each node in the first sub-network to a destination node in the second sub-network, a first test message having a predetermined message size;
- receiving, by each node in the first sub-network from a source node in the second sub-network, a second test message;
- measuring, by each node in the first sub-network, the elapsed communications time between the sending of the first test message and the receiving of the second test message;
- selecting the longest measured elapsed communications time; and
- calculating the bisection bandwidth for the data communications network in dependence upon the number of the nodes in the first sub-network, the predetermined message size of the first test message, and the longest measured elapsed communications time.

14. The computer program product of claim 13 wherein the destination node for each node in the first sub-network and the source node for that node are the same node.

15. The computer program product of claim 13 wherein:
- sending, by each node in the first sub-network to a destination node in the second sub-network, a first test message further comprises:
- selecting a set of nodes in the second sub-network, the set comprising the same number of nodes as the number of nodes in the first sub-network, and
- sending, by each node in the first sub-network to each node in the selected set of nodes in the second sub-network, the first test message; and
- receiving, by each node in the first sub-network from a source node in the second sub-network, a second test message further comprises receiving, by each node in the first sub-network from each node in the selected set of nodes in the second sub-network, the second test message.

16. The computer program product of claim 13 wherein the first test message and the second test message are the same size.

17. The computer program product of claim 13 wherein the nodes in the data communications network are partitioned into the sub-networks such that physical links between the sub-networks are minimized and such that the difference between the number of the nodes in each sub-network is below a predetermined threshold.

18. The computer program product of claim 13 wherein the nodes in the data communications network are compute nodes comprised in a parallel computer, the compute nodes connected together for data communications through a plurality of data communications networks, at least one of the data communications networks optimized for point to point operations, at least one of the data communications networks optimized for collective operations.

19. The computer program product of claim 13 wherein the computer readable medium comprises a recordable medium.

20. The computer program product of claim 13 wherein the computer readable medium comprises a transmission medium.

* * * * *